UNITED STATES PATENT OFFICE.

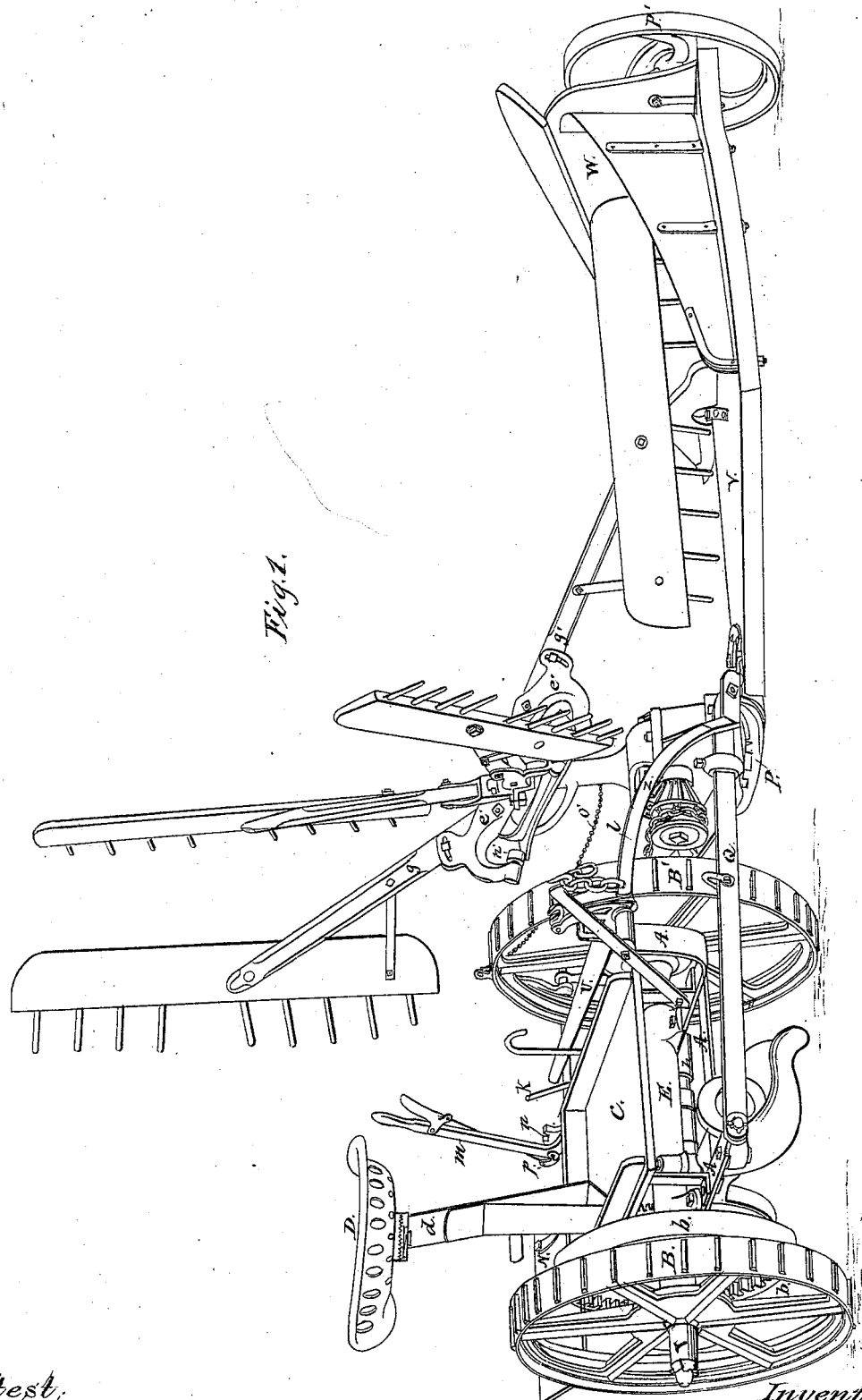

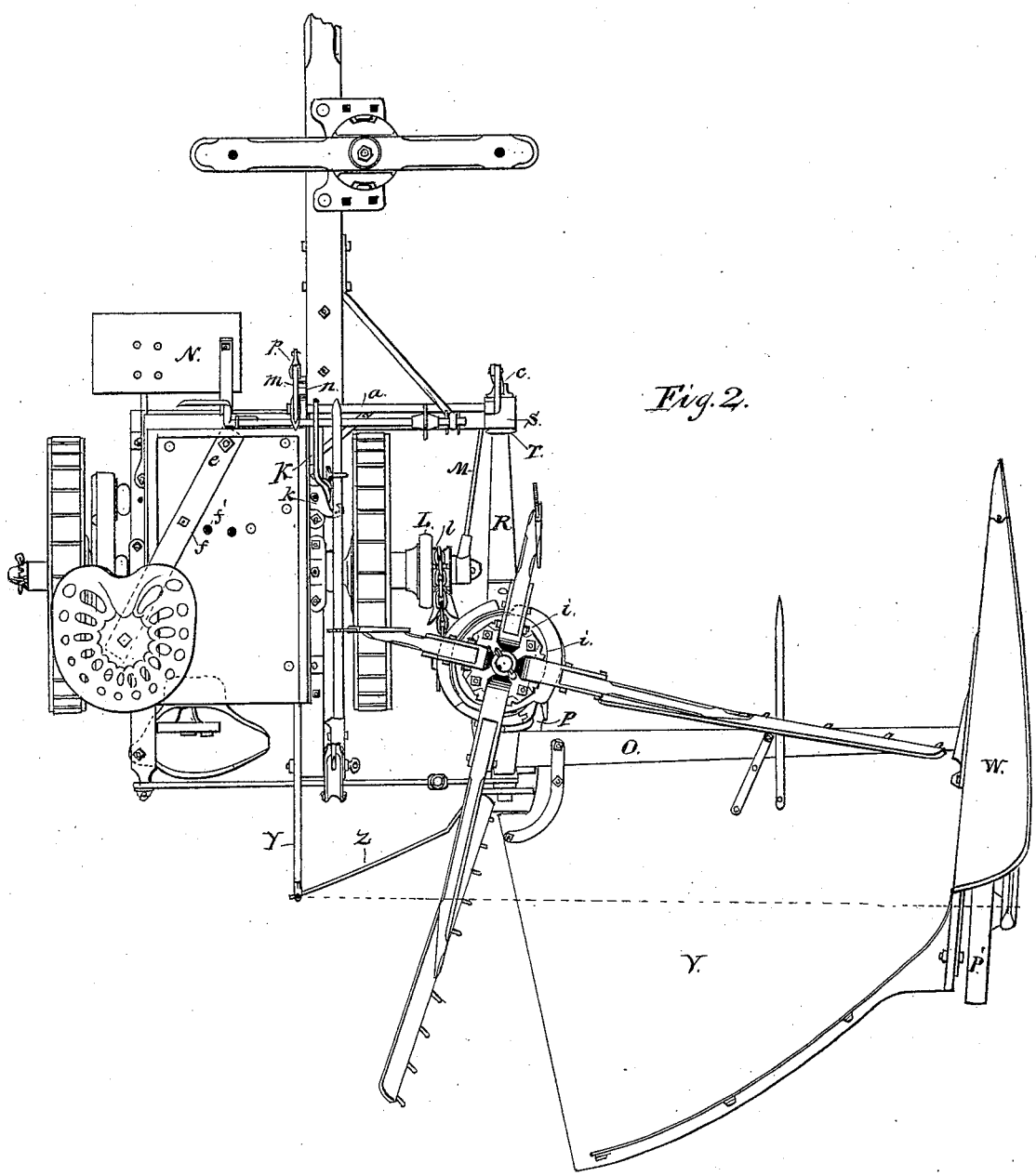

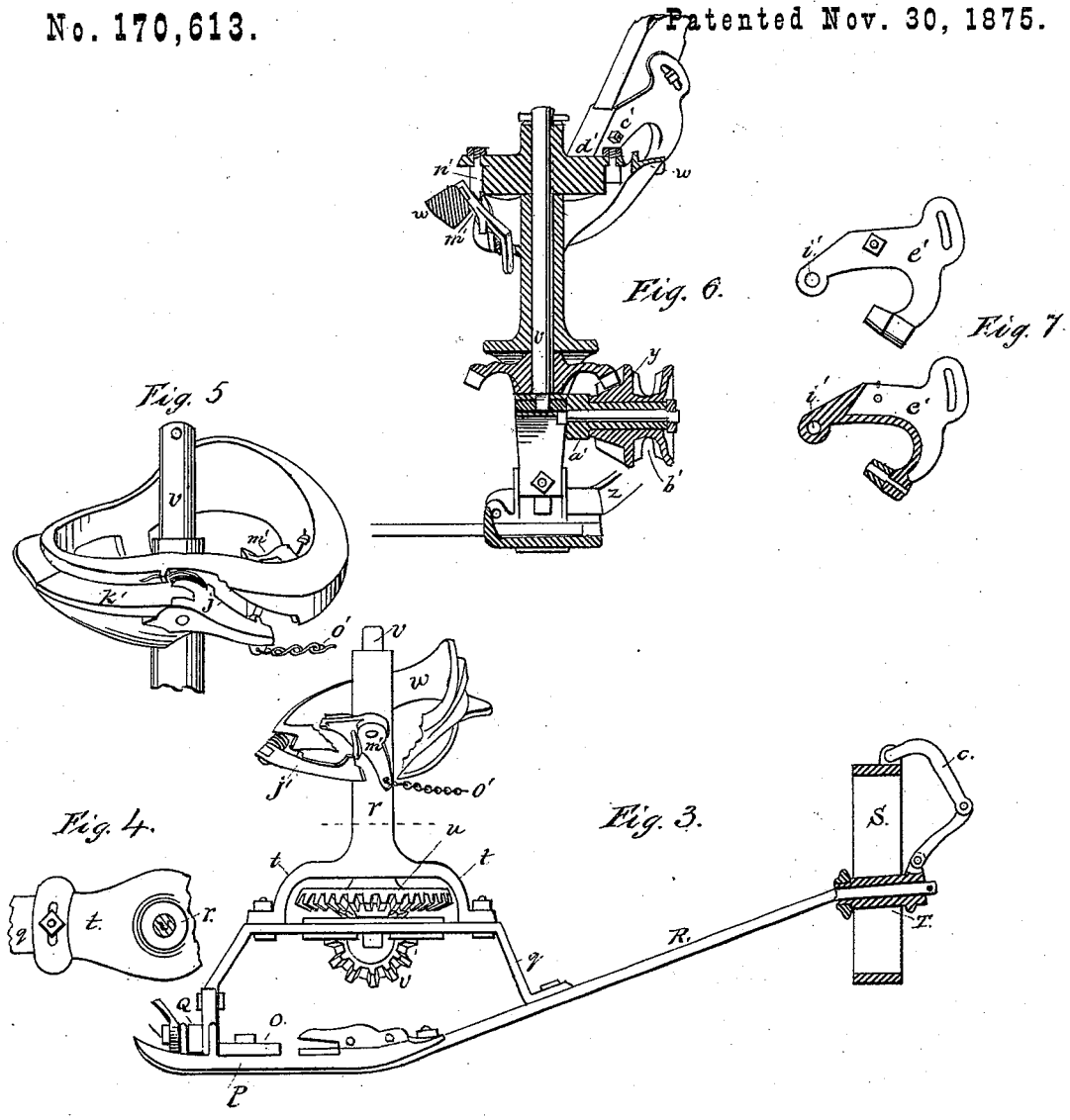

WILLIAM N. WHITELEY, OF SPRINGFIELD, OHIO.

IMPROVEMENT IN HARVESTER-RAKES.

Specification forming part of Letters Patent No. 170,613, dated November 30, 1875; application filed December 29, 1873.

*To all whom it may concern:*

Be it known that I, WILLIAM N. WHITELEY, of Springfield, in the county of Clarke and State of Ohio, have invented a new and useful Improvement in Harvesters; and I do hereby declare the following to be a full, clear, and exact description of the same, reference being had to the accompanying drawings, in which—

Figure 1 is a perspective view of my machine arranged as a reaper. Fig. 2 is a plan view of the same. Fig. 3 is an elevation of the drag-bar and rake stand. Fig. 4 is a plan of the foot of the rake-stand. Fig. 5 is an elevation of the rake-cam. Fig. 6 is an elevation and section of the rake-stand. Fig. 7 represents, in elevation and section, one of the rake-arm heads.

This invention relates to that class of harvesters known as independent or double-jointed machines; and it consists, first, in the cam-switches; second, in the construction of the base-plate and pinion-stud.

That others may fully understand my invention, I will particularly describe it.

The main frame A is constructed, preferably, of wrought-iron bars riveted or bolted together at their intersection. The frame A is provided with suitable boxes for the reception of the axle of the main driving and supporting wheels B B', and for the counter-shaft and gearing, whereby motion is transmitted to the operative mechanism. A platform, C, is mounted upon said frame A to support the driver's seat D. The inner wheel B' is independent, and drives the rake and reel only, so that the raking devices and cutting apparatus are driven by independent powers. For this purpose I place a sprocket-pulley, L, upon the main axle for the driving-chain $l$, for the propulsion of the rake and reel. A string-brace, M, extends from the inner end of the main axle F to the front cross-bar of the main frame A, to support said axle against any strains incident to the action of the wheel B in driving the reel.

When the machine is used for reaping, a platform, V, divider W, and grain-wheel P are attached to the cutting apparatus.

The raking mechanism consists of a revolving reel-rake moving upon a vertical axis, and standing upon a bridge-plate, $q$, the rear end of which is bolted to the inner shoe P, and the front end to the drag-bar or shoe-plate R. The reel may thereby be elevated above the shoe sufficiently to give the necessary clearance for the pitman, &c., and may be set forward sufficiently far to cause the reel-beaters to bring the grain properly down to the cutters. The rake-stand consists of a hollow column, $r$, with arched legs $t$ extended front and rear, and transversely-slotted feet to rest upon and be bolted to the bridge-plate with a lateral adjustment. The arched legs $t$ serve to elevate the column $r$, so as to admit the bevel-driver $u$ between the bottom of said column and the bridge-plate $q$, and thereby enable the rake-shaft $v$ to have a bearing at its lower end below the bevel-driver $u$ in the bridge-plate. The cam or guideway $w$ is cast in one piece with the column $r$, or rigidly secured thereto, and it is adjusted to secure the proper stroke of rake and reel by a rotary movement of said column. This movement is permitted by the slots in the feet, and the bearing of the shaft $v$ in the bridge keeps the column truly centered while being adjusted. This is a considerable advantage, as it obviates a great part of the care necessary in making this adjustment, and guarding against a displacement of the center. The bevel-wheel $u$ is driven by a pinion, $y$, mounted upon a spindle, $a'$, which is bolted to the bridge $q$, and projects laterally therefrom. The back of the pinion $y$ has a sprocket-pulley, $b'$, over which the chain $l$ passes to transmit motion from the driving-wheel B'. At the top of the shaft $v$ there is mounted the revolving head $d'$, to which the rake or reel arm heads $e'$ are pivoted by the joint-bolt $i'$. These rake-arm heads are bifurcated to receive the ends of the rake-arms $g'$, which are secured therein by pivot-bolts near the ends of the arms, and adjusting-bolts, which pass through curved slots near the ends of the heads. The outer ends of the head $e$ are brought together beneath the arm $g'$, and a friction-roller, $h'$, is mounted at the said junction to travel upon the camway $w$, and guide the rake and reel-beaters in their proper course. The axis of the roller $h'$, if prolonged, would cut the axis of the joint-bolt $i$, so that said roller will pass over the camway $w$ without slip, however irregular the curves of said way may be. The camway $w$ is provided with a switch, $j'$, which, when open, causes the rake-arm to rise up as soon as the beater has passed the cutters, and when closed causes said arm and beater to move over the platform in a path parallel therewith, and rake off the gavel. A movable bridge piece, $k'$, is employed to carry the rake-arm from the switch $j'$ to the permanent camway.

Switches and movable bridges have heretofore been employed for a similar purpose, but with these differences in construction, i. e., they have usually moved upon vertical or horizontal axis. They have moved upon separate pivots, and have acted upon each other by some intervening device.

The switch, which is herein shown and described, with the movable bridge-piece, is so constructed as to be placed upon a single stud or pivot, and their axis is oblique to the axis of the rake-shaft, and, if prolonged, would cut the axis of the joint-bolt $i'$. The movements of the switches and the rollers upon the rake-heads are all, therefore, systematic, and with the least resistance.

When the switch $j'$ is closed the roller $h'$ of the next succeeding rake-arm passes below said switch, and the rake-beater sweeps the grain from the platform. This being accomplished, the roller $h'$ traverses the reaper, an incline of the camway $w$ passes under the bridge $k'$, which rises to permit its passage, and said bridge being mounted with a hinge-joint upon the same stud with the switch $j'$, the latter is forced to open as the bridge rises, and said switch is caught and held open by a bell-crank latch, $m'$, which is pivoted to the inner surface of the camway. Said latch is periodically moved, and the switch released by a stud, $n'$, projecting downward from the revolving head $d$; or, if the standing grain is very thin or very irregular, the driver may liberate the switch at any moment by a direct pull upon the lower or bell-crank end of the latch $m'$, the cord or chain $o'$ being provided for that purpose. By this arrangement the latch is operated upon directly and without passing the cord or chain $o'$ under a pulley. A small spring coiled about the axis of the switch $j'$ causes it to close automatically as soon as released by the latch. The latch $m'$ is located directly under the path of the stop-bolts, which retain the joint-bolts $i'$ in place, and the tripping-stud $n'$ is, therefore, one of said stop-bolts with an elongated head, as shown.

The latch chain or cord $o'$ is connected to a rock-lever, mounted in bearings at the front of the machine, and with a foot-crank at one end, so that the said latch may be released by act of the driver's foot whenever he so desires.

Having now described my improvement, what I claim as new is—

1. The combination of the shaft $v$ with the bevel-wheel $u$, and the column $r$ provided with arched feet $t$, and the bridge-plate $q$, whereby the lower step or bearing of said shaft is in said bridge-plate and below said bevel-wheel, as set forth.

2. The switch $j'$ and the bridge $k'$ moving upon an oblique axis, which, if prolonged, would cut the orbit of the joint-bolt $i'$, as and for the purpose set forth.

3. The switch $j'$ and the bridge $k'$, constructed with a hinge-joint and mounted upon a single stud, as set forth.

4. The combination, with the bevel-wheel $u$ and its bearings in the bridge-plate, of the bevel sprocket-pinion $y$, and its spindle $a'$, secured to and projecting laterally from the edge of said bridge, as set forth.

W. N. WHITELEY.

Witnesses:
JAMES A. PARKHILL,
SAML. C. LEE.